United States Patent [19]

Coomber

[11] 3,988,839

[45] Nov. 2, 1976

[54] MODEL AIRCRAFT INCIDENCE GAUGE

[76] Inventor: Allen J. Coomber, 1401 Central Ave., Billings, Mont. 59102

[22] Filed: July 3, 1975

[21] Appl. No.: 592,914

[52] U.S. Cl. .................................. 33/371; 33/391; 73/147
[51] Int. Cl.² .................... G01C 9/12; G01M 9/00
[58] Field of Search .............. 73/147; 33/89, 174 C, 33/283, 285, 333, 343, 370, 371, 372, 373, 391

[56] References Cited
UNITED STATES PATENTS

| | | | |
|---|---|---|---|
| 2,016,275 | 10/1935 | Carroll | 33/283 |
| 2,348,095 | 5/1944 | Roby | 33/174 C |
| 2,968,873 | 1/1961 | Holderer | 33/371 |
| 3,380,170 | 4/1968 | Read | 33/174 C |
| 3,803,721 | 4/1974 | Matsui | 33/283 |

Primary Examiner—Richard C. Queisser
Assistant Examiner—John S. Appleman
Attorney, Agent, or Firm—Berman, Aisenberg & Platt

[57] ABSTRACT

A gauge for measuring the angle of attack, or incidence of a wing or horizontal stabilizer-elevator on a model aircraft is described. The gauge comprises an L-shaped angle beam having a gravity-type angular indicator mounted on its shorter arm. Slidably mounted on the longer arm is a trailing edge reference block having a notch facing inwardly toward a similar notch in the shorter arm of the angle beam. In measuring the angle of incidence the model aircraft is stabilized in one position and the notch in the shorter arm of the angle beam is placed against the leading edge of the wing and the trailing edge reference block is slid forward along the longer arm of the angle beam until the notch in the reference block is secured against the trailing edge of the wing. The relative incidence of the wing may then be read from the indicator.

2 Claims, 10 Drawing Figures

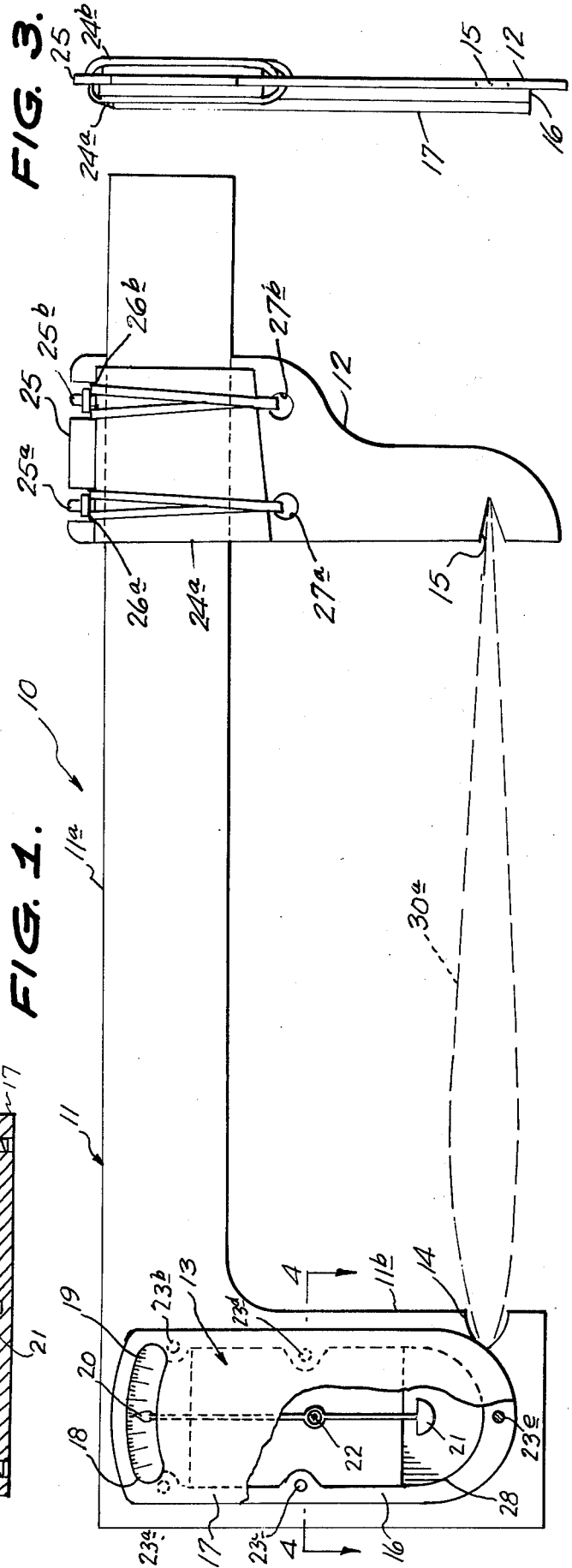

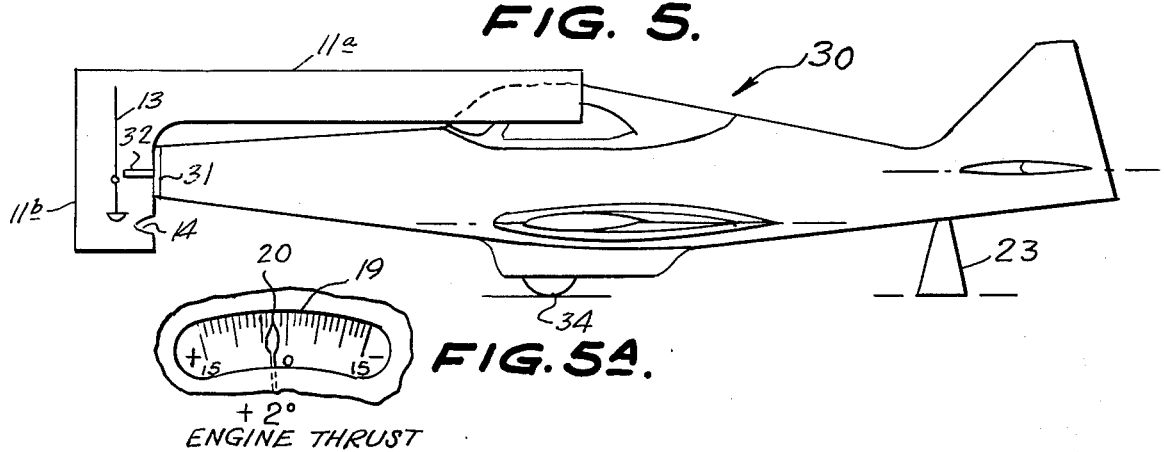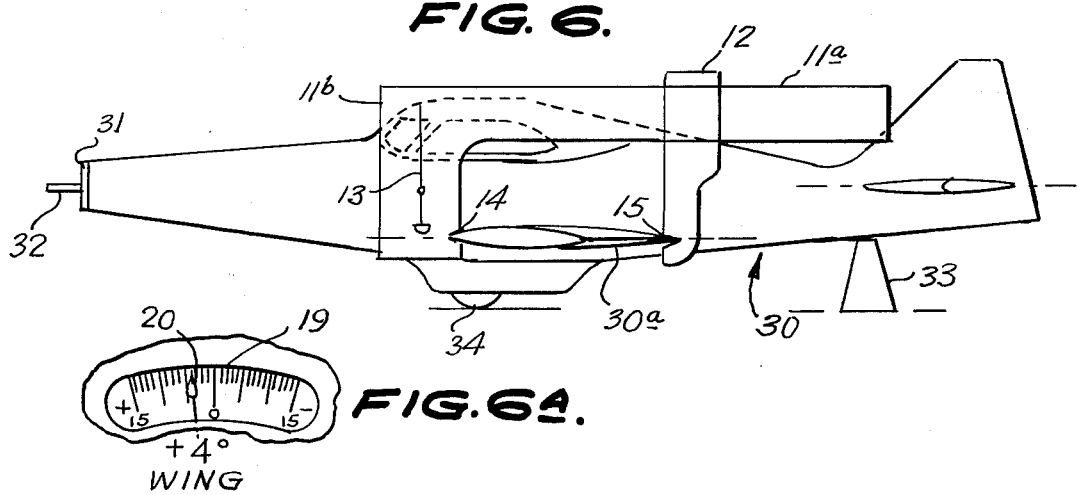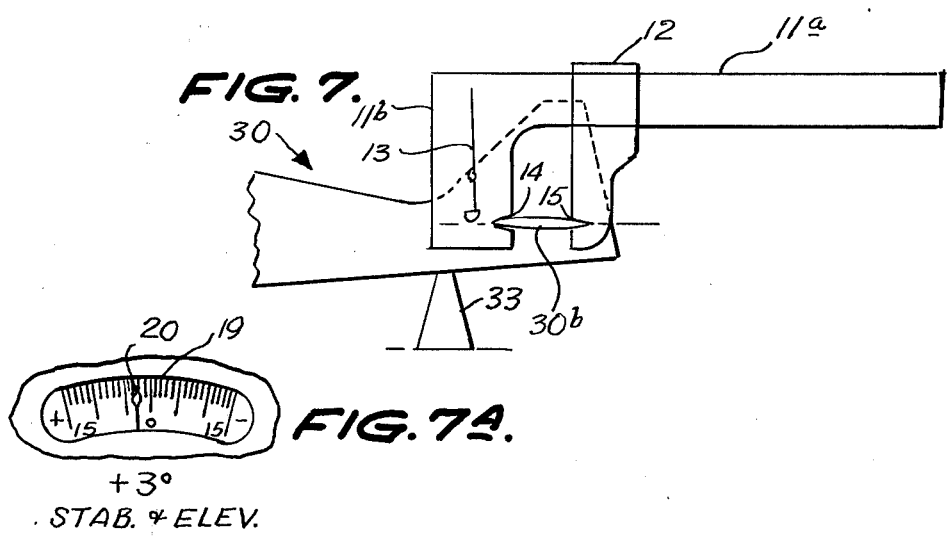

MODEL AIRCRAFT INCIDENCE GAUGE

BACKGROUND OF THE INVENTION

1. Field of the Invention

This invention relates to model airplanes and more particularly relates to an instrument for determining the angle of attack or incidence of a wing or horizontal stabilizer-elevator, the amount of wash-out or wash-in in a wing or tail and the angle of engine thrust in a model aircraft.

2. The Prior Art

In constructing a flying model aircraft, it is well known that certain parameters are critical in determining the flight characteristics of the aircraft and, in fact, determining whether or not the aircraft will fly at all. For example, the wing of an aircraft must have a positive angle of attack or incidence in order for it to fly. Other critical parameters are the angle of attack or incidence of the horizontal stabilizer-elevator, the amount of wash-out or wash-in of the wing or tail and the thrust angle of the engine.

Heretofore, there has been no instrument for conveniently obtaining a measurement of these critical parameters either during construction of the model aircraft or for diagnosing the problems with model aircraft which are malfunctioning. The procedures which have been employed have been cumbersome and time-consuming. For example, the method commonly in use for measuring the angle of attack or incidence of a wing involves the step of blocking or immobilizing the fuselage of the aircraft so that it is perfectly parallel to a work table, adjusting the wing so that it is perfectly parallel to the work table, adjusting the wing so as to impart a particular angle of incidence thereto, measuring the distance from the work table to the leading edge of the wing, measuring the distance from the work table to the trailing edge of the wing and computing the angle of incidence through well-known geometric relationships.

The following U.S. Pat. Nos. relate generally to the problem discussed above:

| | | |
|---|---|---|
| 1,494,722 | Tingstrom et al | 1924 |
| 2,402,567 | Milner | 1946 |
| 2,520,934 | Hoy | 1950 |
| 2,531,077 | Mullin | 1950 |
| 2,737,722 | Keim | 1956 |
| 2,770,967 | Du Pont | 1956 |
| 2,872,809 | Yavne | 1959 |

SUMMARY AND OBJECTS OF THE INVENTION

It is a principal object of the present invention to provide an instrument which may readily determine the angle of attack or incidence of a wing or horizontal stabilizer-elevator on a model aircraft.

A further object of the present invention is to provide an instrument which may be used to determine the amount of wash-out or wash-in in a wing or tail of a model aircraft.

Still another object of the present invention is to provide an instrument which will readily provide an indication of the true thrust angle of the engine of a model aircraft.

These and other objects of the present invention are realized in a preferred embodiment wherein an L-shaped angle beam has a notch provided in its shorter arm designed to engage the leading edge of the aircraft wing. Slidably mounted on the longer arm of the L-shaped angle beam is a reference block having a similar notch facing toward the notch in the shorter arm of the angle beam and designed to engage the trailing edge of the wing. Mounted on the shorter arm of the angle beam is a gravity actuated pointer which in conjunction with a scale graduated in degrees provides a reading of relative incidence. In operation, the leading edge notch in the shorter arm of the angle beam is engaged with the leading edge of the wing and the trailing edge reference block is slid along the longer arm of the angle beam until the trailing edge of the wing is engaged with the notch. The relative incidence of the wing may now be read from the indicator. The same procedure is then repeated with respect to the horizontal tail group, with the elevator secured at neutral and the reading is taken from the indicator. To determine the angle of engine thrust, the trailing edge reference block is slid off the longer arm of the L-shaped angle beam and the edge of the shorter arm of the angle beam having the notch in it is placed against a metal disc (spinner back plate) bolted to the crankshaft of the engine. A reading is then taken from the indicator. With the three readings thus obtained, the incidence and thrust angles for the model aircraft can be readily obtained by relating any two readings to the other. Since differences in readings are the only critical factors, the model aircraft need not be parallel to a work surface but rather need only be stabilized in a fixed position.

BRIEF DESCRIPTION OF THE DRAWINGS

FIG. 1 is a front elevation of the gauge of the present invention;

FIG. 2 is a top plan view of the gauge of the present invention;

FIG. 3 is an end elevation of the gauge of the present invention;

FIG. 4 is a sectional view taken on the line 4—4 in FIG. 1 looking in the direction of the arrows;

FIG. 5 is a schematic diagram illustrating how the gauge of the present invention may be utilized to measure engine thrust;

FIG. 5A illustrates an example of a typical engine thrust reading;

FIG. 6 is a schematic diagram illustrating how the gauge of the present invention may be utilized to measure the angle of incidence of a wing;

FIG. 6A provides a typical illustration of a wing incidence reading;

FIG. 7 is a schematic diagram illustrating how the gauge of the present invention may be utilized to measure the incidence of the horizontal stabilizer-elevator; and FIG. 7A provides an indication of a typical horizontal stabilizer-elevator incidence reading.

DETAILED DESCRIPTION OF A PREFERRED EMBODIMENT

Referring now to FIGS. 1, 2, 3 and 4, there is shown the incidence gauge of the present invention generally designated by the reference character 10. The incidence gauge comprises a generally L-shaped angle beam 11 having a longer arm 11a and a shorter arm 11b disposed at a 90° angle with respect to each other. Provided in the inner side surface of shorter arm 11b is notch 14 for a purpose which will become apparent hereinbelow.

Slidably mounted on longer arm 11a is a trailing edge reference block 12 having notch 15 formed on its inner side surface and oppositely disposed with respect to notch 14. Sliding trailing edge reference block 12 is provided with guide arms 24a and 24b for engaging the opposite sides of longer arm 11a and insuring the smooth passage of reference block 12 along arm 11a. Mounting block 25 having mounting posts 25a and 25b is disposed on the upper surface of longer arm 11a and between guide arms 24a and 24b. Rubber bands 26a and 26b pass around mounting posts 25a and 25b and through holes 27a and 27b, respectively, provided in trailing edge reference block 12. Thus, trailing edge reference block 12 is securely held to longer arm 11a and may be slidably moved therealong.

Secured to shorter arm 11b is the indicator for the gauge of the present invention generally designated by the reference character 13. Indicator 13 comprises a dial 19 graduated in degrees and which may be affixed as by gluing or any other suitable method to the surface of angle beam 11. Pivotally secured to shorter arm 11b by any suitable fastening means at 22 is pointer 20 having a weighted end 21 which is free to rotate in depression 28 provided in the surface of shorter arm 11b. Spacer 16 is placed over shorter arm 11b, surrounding depression 28 and dial 19. Cover plate 17 having dial cut-out 18 is placed over spacer 16 and the cover plate and spacer are secured to shorter arm 11b by mounting screws 23a–23e or other suitable means.

As shown in FIG. 1 in dotted outline, a wing or other air foil 30a of a model aircraft is placed between notches 14 and 15. Weighted end 21 will then cause pointer 20 to move along dial 19 in accordance with the angle of incidence of the air foil. A relative angular reading may then be obtained from dial 19.

Turning now to FIGS. 5 and 5A, 6 and 6A and 7 and 7A, a typical example for utilizing the gauge of the present invention will be illustrated. In all cases, model aircraft 30 has its landing gear 34 resting on a surface and stabilizing block 33 is provided to maintain the aircraft in a fixed position, although not necessarily parallel to the work surface.

In FIGS. 5 and 5A, the engine thrust is measured by sliding trailing edge reference block 12 completely off longer arm 11a and placing the inner surface of shorter arm 11b against spinner back plate or other metal disc 31 which is bolted to crankshaft 32 of the engine. As shown in FIG. 5A, pointer 20 records the reading of plus 2° on dial 19. This reading is then recorded.

Turning next to FIGS. 6 and 6A, the angle of incidence of wing 30a is shown being measured. In this case, sliding reference block 12 is replaced on longer arm 11a, and notch 14 is placed against the leading edge of wing 30a so that the front of the air foil is referenced to the center of the notch. (Generally speaking, the angle of the attack of a wing is determined by drawing a straight line through the furthest point forward to the furthest point aft and referencing it to the angle of forward movement of the aircraft). Trailing edge reference block 12 is then moved along longer arm 11a until notch 15 engages the trailing edge of wing 30a. As seen in FIG. 6A, the angle of incidence may now be read from dial 19 and in a typical example results in a plus 4° reading. This value is then recorded.

Turning next to FIGS. 7 and 7A, the procedure described above with respect to wing 30a is repeated for stabilizer-elevator 30b, resulting in a reading of plus 3°. This value is then recorded.

From the above recorded readings, it can be seen that the wing 30a has 1° of positive incidence and the engine has 1° of negative (down) thrust in relation to the stabilizer-elevator group. Similarly, the wing incidence and the stabilizer-elevator incidence may be referenced to the engine thrust and the engine thrust and stabilizer-elevator incidence may be referenced to the wing. It can thus be observed that since only relative differences in readings are required by utilizing the gauge of the present invention, it is not necessary for the model aircraft to be level or parallel with the work surface but only stabilized in one position.

When side thrust and vertical fin and rudder readings are to be taken, the aircraft is rotated 90° and the same procedure is followed as set forth above.

In measuring wash-out or wash-in, the procedure described above for measuring the angle of incidence for the wing is repeated at various points along the wing surface.

In a preferred embodiment of the invention, the major components of the gauge such as angle beam 11, reference block 12, guide arms 24a and 24b, mounting block 25, spacer 16 and cover plate 17 were formed of plexiglass. However, it should be realized that other suitable materials may be utilized and that other changes may be made in the form and construction of the incidence gauge without departing from the spirit and intent of the invention. Therefore, it is intended that the scope of the invention be defined only by the claims set forth hereinbelow.

I claim:
1. A model aircraft gauge for measuring angle of attack or incidence, wash-out or wash-in and angle of engine thrust comprising:
   a. a substantially L-shaped member having a longer arm and a shorter arm with a first edge, straight over a substantial part of its length so as to be engageable with a model element transverse to the axis of said engine thrust;
   b. a reference block freely, slidably mounted on the longer arm of said L-shaped member and disposed in substantially parallel relationship to the shorter arm of said L-shaped member, the mounting of said reference block on the longer arm being such that it may be completely slid off said longer arm so as to permit the measurement of engine thrust;
   c. airfoil engaging means on the shorter arm of said L-shaped member and on said reference block for making light frictional contact with the two edges of a model aircraft airfoil, said airfoil engaging means comprising a pair of oppositely facing notches disposed respectively in said shorter arm and the facing edge of said reference block, said notches being dimensioned so as to accommodate a wide range of airfoil chord sizes; and
   d. a gravity actuated pointer and a dial affixed to said L-shaped member such that the pointer axis and said first edge of the shorter arm are subtantially parallel when the pointer indicates a zero angle.

2. The gauge set forth in claim 1 wherein said pointer is pivotally secured to said shorter arm and comprises one end which moves across said dial and a weight secured to its opposite end.

* * * * *